United States Patent [19]
Arsem

[11] Patent Number: 5,059,445
[45] Date of Patent: Oct. 22, 1991

[54] PROCESS FOR PRODUCING FREEZE DRIED MEAT

[76] Inventor: Harold B. Arsem, 1712 Elm Ave., Richmond, Calif. 94805

[21] Appl. No.: 649,192

[22] Filed: Feb. 4, 1991

Related U.S. Application Data

[63] Continuation of Ser. No. 463,269, Jan. 10, 1990, abandoned.

[51] Int. Cl.$^5$ .............................................. A23L 1/311
[52] U.S. Cl. ................................... 426/646; 426/385; 426/810
[58] Field of Search ............... 426/302, 385, 641, 646, 426/384, 524, 810

[56] References Cited

U.S. PATENT DOCUMENTS

| | | | |
|---|---|---|---|
| 1,517,445 | 12/1924 | MacLachlan et al. | 426/646 |
| 3,083,108 | 3/1963 | Kline et al. | 426/646 |
| 3,264,121 | 8/1966 | Tuomy et al. | 426/385 X |
| 3,971,854 | 7/1976 | Hinnergardt | 426/385 X |
| 4,000,035 | 3/1986 | Berkowitz | 426/385 X |
| 4,786,516 | 11/1988 | Sugisawa et al. | 426/385 |

FOREIGN PATENT DOCUMENTS

| | | | |
|---|---|---|---|
| 940003 | 10/1963 | United Kingdom | 426/646 |
| 1451446 | 10/1976 | United Kingdom | 426/646 |

*Primary Examiner*—Arthur L. Corbin
*Attorney, Agent, or Firm*—Robert M. Wolters

[57] ABSTRACT

A process for producing freeze dried meat is disclosed. Starch is dispersed in water, whole egg is added and mixed, and then ground meat is blended in. Polar compound from the egg protects oxygenation sites on the meat during initial freezing at ambient pressure, and subsequent freeze drying.

4 Claims, 1 Drawing Sheet

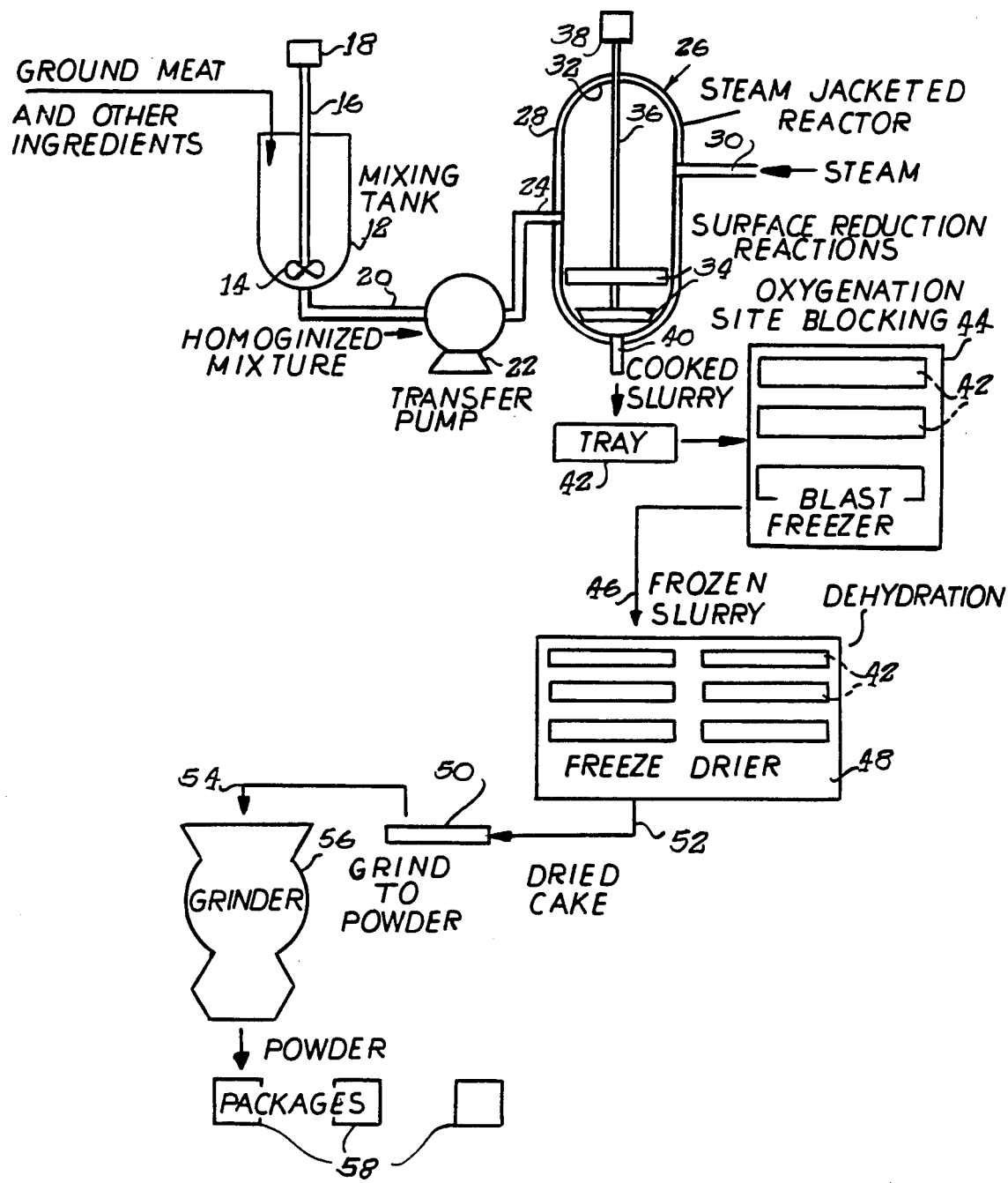

PROCESS FOR PRODUCING FREEZE DRIED MEAT

This is a continuation of application Ser. No 07/463,269 filed Jan. 10, 1990 now abandoned.

BACKGROUND OF THE INVENTION

Previous efforts have been made to freeze dry meat. Freeze dried meat is a desirable commodity, which like other freeze dried food products could be stored without refrigeration, and which also takes up relatively low space and is of low weight for backpacking, space missions, etc. Another desirable area for freeze dried meat has recently occurred, in that there are many weight loss diets which are near starvation diets, and in which the diet is carried on under medical supervision. For a period of time, perhaps the first three months, the person on such a diet does not actually eat any food, but only consumes a few hundred calories a day of powder mixed in water or diet beverage, which powder is formulated to provide all of the necessary amino acids and other dietary necessities to maintain the human body and provide proper electrolyte balance. Such diets leave the patient with no taste of food for an extended period, and the patient must subsequently be taught to eat again. It would be desirable if a taste of meat or chicken could be provided during the non-eating portion of the diet, and this could be provided with very few calories from a freeze dried meat product, if such were available.

Unfortunately, prior art freeze dried meat processes with which I am familiar result in browning and hardening of the meat, very similar to what takes place when a piece of meat is left unwrapped in the refrigerator for a few days. This is a result of oxidation of the proteins in the meat. Consequently, prior art freeze dried meat products have not been satisfactory.

OBJECTS AND SUMMARY OF THE PRESENT INVENTION

In view of the foregoing, it is an object of the present invention to provide a process for producing a palatable freeze dried meat product.

More particularly, it is an object of the present invention to provide a freeze dried meat powder and a process for making the same in which the meat proteins are protected against oxidation.

In carrying out the foregoing and other objects of the present invention a ground meat product is mixed with a slurry of starch and egg. The solution is heated and held for a short time at an elevated temperature, and then frozen and subsequently freeze dried. The resulting meat product is not the usual hard and brittle dried meat material, but rather is still slightly soft and retains much of the original meat flavor. This results from reduction of oxidation sites on the meat protein by glucose molecules derived from the starch, and from egg protein attached to the oxidation sites and protecting the meat from deterioration during drying.

THE DRAWINGS

FIG. 1, the sole figure of the present drawings, is a flow diagram illustrating the present process.

The invention will best be understood with reference to this drawing in connection with the following specification.

DETAILED DISCLOSURE

A mixing tank 12 is provided with a propeller or the like mixing device 14 mounted on a shaft 16 and driven by an electric motor 18. Water is placed in the tank, and starch and whole eggs are added and thoroughly mixed in the water. Ground meat then is added to the tank and blended in so that there is consistant mixture of meat, starch and eggs. On a laboratory scale a blender has been found to be excellent for cutting and mixing the material so that the meat is well coated with the protective solution. This has also been done on a much larger scale with other mixing equipment.

The resulting solution or homogenized mixture is then passed through a pipe or passageway 20, a transfer pump 22, and a further pipe or passageway 24 to a heating device, specifically shown as a steam jacketed reactor having a jacket 28 supplied with steam through a pipe 30, and heating the internal chamber 32. A further mixing device comprising paddles 34 or the like on a shaft 36 driven by an electric motor 38 is disposed within the inner chamber 32 of the reactor for further agitation of the mixture during heating. The solution or homogenized mixture is heated to about 180° F. and held for 15 minutes. The cooked slurry is then deposited from the heating device 26 through an outlet pipe or the like 40 into a succession of trays 42. The trays are then sequentially transferred into a blast freezer 44 for initial freezing of the homogenized mixture or cooked slurry.

The trays are then transferred as indicated at 46 to a freeze dryer 48 of known construction. The result is dried cakes of freeze dried meat product identified at 50 and transferred at 52 and 54 from the freeze dryer to a grinder 56 in which the cakes are ground to a powder. The ground powder then exits from the bottom of the grinder into a succession of packages 58 for storage and transportation. As will be appreciated, the packages are sealed, and may comprise plastic envelopes, thereby to preclude as far as possible the entrance of oxygen into the freeze dried powder.

The chemistry that accompanies the foregoing process is important. Starch will be recognized as being a disaccharide, and the eggs will be understood as containing polar sulfhydryl groups in the ovalbumens. The starch and eggs work in conjunction with one another to cover and protect the active oxidation sites on the meat proteins. When heated the starch breaks down into glucose molecules with an active reducing end on the molecule. As will be recognized by those skilled in the chemical arts reduction and oxidation are opposite processes. The reducing ends on the starch act to scour the meat protein of oxygen and clear the components that occupy the oxidation sites. This leaves a highly active protein ready to react with any oxidizer.

The water in the solution freezes first. There is a consequent migration of the glucose into lumps or aggregates, and a movement of the egg proteins to the oxidation sites on the meat. The egg proteins tend to attach to the oxidation sites and thus protect the meat from deterioration during the drying process.

Most proteins are not polar. They are electrically the same on one end as on the other end. However, sulfur on the egg proteins provides different charges and hence polarity. The polar proteins continue to protect the meat from oxidation when the meat comes in contact with air. Upon rehydration, when water is added back to the dry and powdered meat product, the polar proteins dissolve into solution, leaving a normal tasting product.

The meat product produced by the freeze drying process described above is slightly soft and has much of the original meat flavor.

It is not necessary that there by a separate mixing tank 12 and steam jacketed reactor 26. The steam jacketed reactor can be used at room temperature for the initial mixing, and then the steam interjected to raise the temperature for further mixing. The heated mixing continues throughout the heating cycle. The reactor has a capacity of approximately 500 gallons, and if a separate mixing tank is used it should be of comparable size. The process has been proven to work well with eight parts of meat to two parts of egg to one part of starch (cornstarch), and four parts of water, on a weight basis.

The blast freezer 44 is typically ten feet high, ten feet wide, and twenty feet deep. It has a high circulation rate of cold air, and the temperature is approximately −40° F., and the wind in the blast freezer blows at about 50 mph. The freeze dryer is generally somewhat smaller, a typical size being ten feet, by ten feet, by ten feet or somewhat larger. The total batch size out typically will run on the order of 100 pounds to 300 pounds, the wet volume running on the order of 125–400 gallons. Many trays at a time are chilled in the blast freezer, and treated in the freeze dryer, perhaps as many as 100 trays at a time.

Although the invention has been described as a batch process, it will be understood by those skilled in the art that the invention could equally well be practiced by a continuous process. I know from my own experience that meat slurries are easy to pump. A continuous process would use flow-through mixing vessels, shell and tube heat exchanges and fed into a continuous freeze dryer, for example, as disclosed in my prior U.S. Pat. 4,590,684.

The specific example as given herein is for purposes of illustration. Various changes in structure will no doubt occur to those skilled in the art, and will be understood as comprising a part of the invention insofar as they fall within the spirit and scope of the appended claims.

The invention is claimed as follows:

1. Process for producing freeze dried meat comprising mixing starch, egg containing protein having polar sulfhydryl groups and ground meat in water to produce a consistent mixture, in which the starch is first dispersed in water, then the egg is added and mixed thoroughly, and then the ground meat is blended in to produce a consistent mix, heating the mixture while continuing to mix it, the heating step converting at least some of the starch to glucose with an active reducing end on the molecule, the active reducing end creating a reducing environment for the meat protein, then freezing the mixture at atmospheric pressure without dehydrating it, such freezing without dehydration effecting movement of the egg polar protein to oxygenation sites on the meat to protect the meat against oxidation, subsequently freeze drying the meat, and then reducing the freeze dried meat to a powder.

2. Process for producing freeze dried meat as set forth in claim 1 wherein the starch and egg coat the meat.

3. Process for producing freeze dried meat as set forth in claim 1 wherein the starch, egg and ground meat are initially mixed in water in a tank, wherein subsequent heating and mixing are effected in a tank, and wherein the resulting mixture is transferred to trays for transfer to a blast freezer, and subsequently to a freeze dries.

4. Process for producing freeze dried meat as set forth in claim 1 wherein there are provided substantially eight parts of meat, two parts of egg, one part of starch and four parts of water on a weight basis.

* * * * *